Patented Dec. 28, 1926.

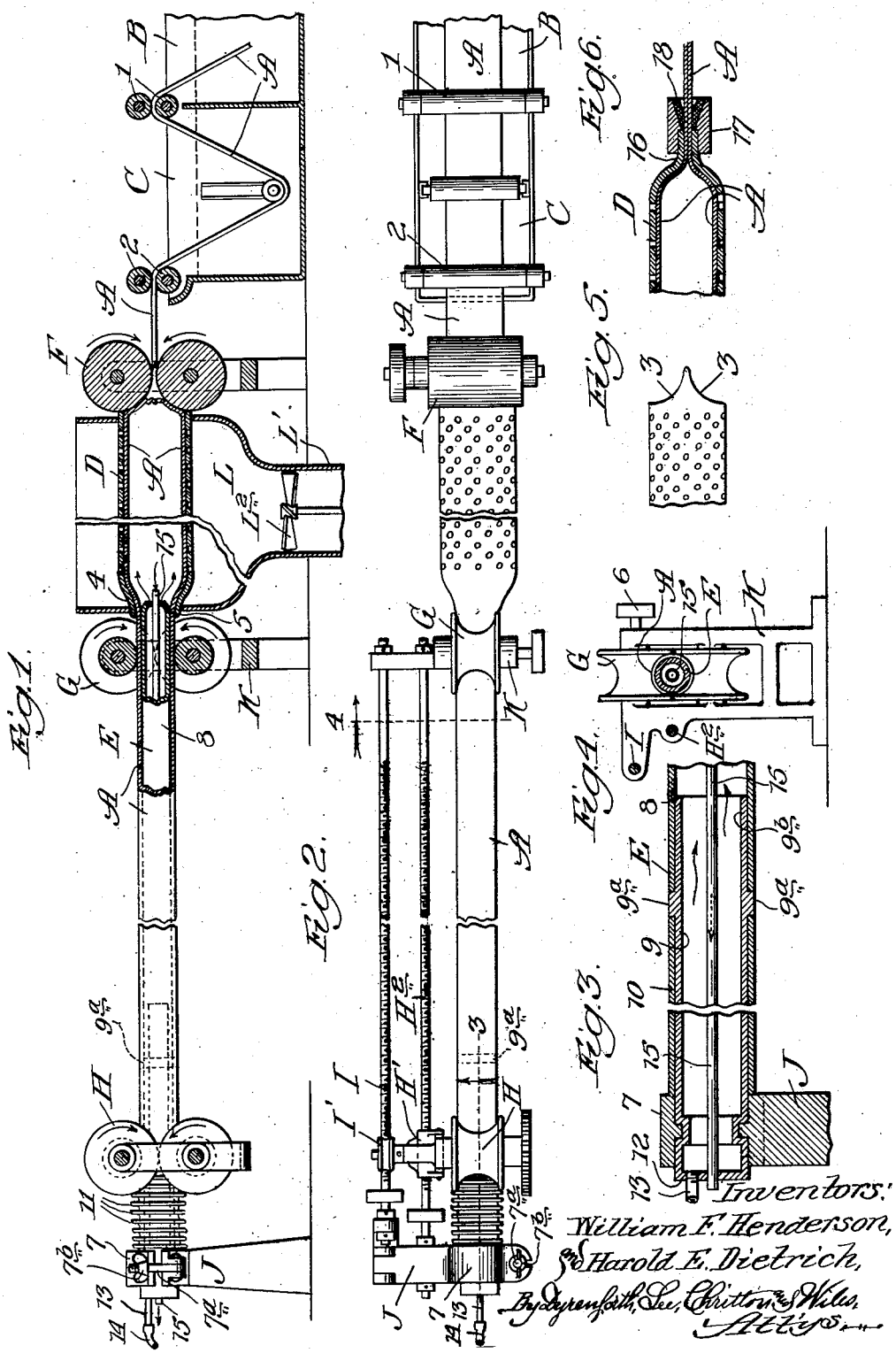

1,612,509

UNITED STATES PATENT OFFICE.

WILLIAM F. HENDERSON AND HAROLD E. DIETRICH, OF CHICAGO, ILLINOIS, ASSIGNORS TO THE VISKING CORPORATION, OF RICHMOND, VIRGINIA, A CORPORATION OF VIRGINIA.

APPARATUS AND METHOD FOR TREATING SAUSAGE CASINGS.

Application filed April 14, 1926. Serial No. 101,959.

This invention relates particularly to a method and apparatus for treating sausage casings, or the like. The invention is particularly intended for the treatment of casings composed of cellulose, or cellulose hydrate, but may be employed in connection with the treatment of intestinal casings.

The invention constitutes a modification of the invention disclosed in our application No. 101,958, filed April 14, 1926. The primary purpose of the broad invention is the production of improved sausage casings which can be kept in stock for a long period, without deterioration, and which can be used with great facility and in an economical manner in a packing house. Further objects of the broad invention are disclosed in our companion application mentioned.

The primary object of the present invention is to provide for the quick and economical treatment of a cellulose casing in a practically continuous manner as the casing comes from the extruding machine and the purifying baths.

In accordance with the invention, the casing is subjected to a drying operation while in inflated condition. It is preferred, however, to lead the sausage casing from the purifying bath through a dilute glycerin solution, and thus introduce into the casing a hygroscopic agent which will serve to retain or attract just sufficient moisture to keep the casing flexible and moderately tough after the casing has been dried.

It may be stated preliminarily that a cellulose casing which is wet, or quite moist, will not slip readily over the surface of the stuffer horn, but tends to cling firmly to the surface of the horn. On the other hand, such a casing, if bone dry, is liable to crack or tear, and cannot be handled advantageously. Moreover, it has been found important, in drying casings of this character, to effect the drying operation while the casing is maintained in extended condition within a suitable confining wall, which preferably is porous, or foraminous, to facilitate the drying operation. The present invention accomplishes the important result here indicated, in such manner as to render it unnecessary to stop the operation of the extruding machine. That is, the sausage casing is treated and finished with the same degree of rapidity as it is delivered from the extruding machine. The present invention accomplishes the further purpose of loading upon a paper tube in shirred condition a suitable length of dried sausage casing. The paper tube may afterwards be applied to a stuffer horn and the casing fed, or drawn, therefrom, as required in the stuffing operation.

Methods of producing viscose for use in producing a cellulose casing, and then extruding the viscose to form a casing are known, the viscose tube being converted into cellulose, or cellulose hydrate and then passed through a purifying bath, or baths, in known manner. Such methods are referred to more at length in our copending application, mentioned above.

The accompanying drawing illustrates somewhat diagrammatically improved apparatus adapted to the practice of the improved process which is to be described. In the drawing, Fig. 1 represents in elevation, brokenly and partly in section, the improved apparatus; Fig. 2, a plan view of the same; Fig. 3, an enlarged vertical longitudinal sectional view taken as indicated at line 3 of Fig. 2, the casing-shirring rolls not being shown, however; Fig. 4, a vertical sectional view taken as indicated at line 4 of Fig. 2; Fig. 5, a broken elevational view of a foraminous confining tube employed; and Fig. 6, a broken sectional view showing a modification of the confining tube.

In the illustration given, A designates a sausage casing; B, a purifying bath through which the casing is passed as it comes from the extruding machine; C, a bath for introducing into the casing a hygroscopic agent; D, a foraminous, or perforate, confining tube within which the casing is inflated during the drying operation; E, a mandrel-tube over which the casing slips while in the operation of loading the casing in shirred condition upon the paper tube; F, a pair of casing-confining rolls between which the casing passes in entering the confining tube; G, a pair of feed rolls located adjacent the advance end of the confining tube D and co-acting with the tubular mandrel E; H, a pair of shirring rolls mounted on a carriage H' which is given a positive feed by means of a screw H²; I, a worm shaft equipped with a worm wheel I' through the medium of which the rolls H are driven; J, a support for the mandrel-tube and shafts mentioned; K, a support for the rolls G; and L, a drier-chamber provided with an intake pipe L' through which heated dry air is received, the air being forced through the drier-chamber by means of a fan L².

In making cellulose casings, the viscose tube, as it issues from the extruding machine, is treated with suitable chemicals, in the form of a bath, or spray, and thus converted into cellulose, or cellulose hydrate. The cellulose casing is then passed through a purifying bath. In Fig. 1, the cellulose casing A is shown emerging from the purifying bath B, from whence it passes between rollers 1 which express from the casing the excess water. The casing then passes through the tempering bath C which preferably is a dilute solution of glycerin and water. A strength of about twenty percent glycerin is preferred. The casing then passes between rollers 2 which remove the excess glycerin solution. The casing then passes between the rollers F, then through the diameter-limiting tube D, and thence over the mandrel E. The portion of the casing A within the foraminous tube D is inflated and preferably distended slightly beyond its previous diameter, and is subjected to a drying action during its passage through the confining tube. The rollers F preferably are of yielding composition, such as moderately soft rubber. The adjacent end of the confining tube D is open and is cut away as indicated at 3 in Fig. 5, thus affording concave edge-surfaces which bear against the rollers F. The rolls F compress the casing upon itself sufficiently to prevent the passage of air which enters the sausage casing through the hollow mandrel E. The rolls fit closely enough against the end edges of the confining tube D to afford substantially unbroken backing for the rather delicate sausage casing when in the expanded condition.

The foraminous confining tube D preferably is of metal and has its walls provided with numerous perforations to permit escape of moisture. The advance end of the confining tube is constricted somewhat, or made frusto conical, as indicated at 4.

The rear end of the mandrel tube E projects freely into the advance end of the confining tube D, an annular space being preserved, as indicated at 5, to permit the passage of the sausage casing A.

The rolls G preferably are of yielding rubber and have their peripheries so grooved as to embrace the sausage casing in the manner illustrated in Fig. 4. The embrace is close enough to prevent air from escaping from the expanded portion of the casing which is within the confining tube D between the sausage casing and the mandrel E. The rolls G are intended to serve also as feed rolls for advancing the sausage casing on the mandrel. They may be driven, in any suitable manner, through the medium of a pulley 6. They should be geared to feed at approximately the same rate as the other rolls.

The hollow mandrel E has one end fixedly secured in a split ring 7 carried by the support J. The mandrel preferably comprises a rear section 8 and an advance section 9 which is provided with a flange, or collar, 9ª. The section 9 has a reduced end portion 9ᵇ which telescopes with the adjacent end of the section 8. The main portion of the section 9 is of reduced external diameter which provides a set for the paper, or pasteboard tube, 10, upon which a length of the sausage casing is to be shirred, as shown at 11. The tube 10 is of the proper diameter to fit upon the horn of a sausage machine, and may be of a length of 10″ to 12″, to correspond with the length of the horn. It is possible to load such a tube with a section of sausage casing having a length of 30′ to 50′. It may be added that a cellulose casing having a wall thickness of about one thousandth of an inch, more or less, as desired, may be produced. Such a casing, if properly made and finished, may be readily shirred onto a supporting tube, a supporting tube of 10″ to 12″ in length being capable of carrying about 50′ of the casing.

The rolls H serve both as feed rolls for advancing the sausage casing and as a means for shirring the casing onto the paper tube 10. The carriage H' may be mounted in any suitable manner (not shown), and should be fed very slowly, in a positive manner, towards the rear of the mechanism as the shirring operation continues. This may be accomplished in any suitable manner, such as by employing a screw working within a nut with which the carriage is equipped. Suitable provision for expeditiously returning the carriage to fully advanced position may be provided. It is to be understood in the illustration given in Figs. 1 and 2, the shirring operation has proceeded for a time and the carriage H' has receded from its fully advanced position. The purpose of the positive feed of the carriage is to prevent injury to the sausage casing. The carriage should recede at a suitable rate of speed to permit only the desired compacting of the folds of the sausage casing in the shirring operation.

The clamp 7 which holds the advance end of the section 9 of the mandrel E is shown equipped with a pivoted bolt 7ª equipped with a wing nut 7ᵇ, which will permit the clamp to be thrown open when desired.

The mandrel section 9 is provided with a closed end 12 equipped with a nipple 13 connected with an air hose 14. The wall 12 also supports a central air-escape tube 15 which extends through the tubular mandrel E and into the advance end of the confining tube D. Air under moderate pressure enters through the nipple 13 and the tubular mandrel E and inflates the sausage casing A and the confining tube D. The air then escapes slowly through the small tube 15, the escape being slow enough to maintain the portion of the sausage casing which is within the confining tube D in inflated condition. This inflating air preferably is warm and dry, and aids in the drying operation. The chief purpose, however, is to maintain the sausage casing in well-stretched condition during the drying operation. Thus, the characteristic shrinking of the cellulose in the drying operation is obviated.

After the paper tube 10 has been loaded with sausage casing in shirred condition, the shirring rolls H having in the meantime receded, the casing is severed back of the collar 9ª, the clamp 7 is opened, and the mandrel section 9 carrying the paper tube 10 is removed, an operator in the meantime supporting the advance end of the section 8 by hand. A fresh mandrel-section 9 carrying another paper tube 10 is then introduced. In the meantime, the shirring rolls continue their action, and the shirred end of the sausage casing is later moved over onto the paper tube 10; the shirring rolls are then moved up to substantially their fully advanced position, and the mechanism operates as before.

It will be understood that the sausage casing is drawn up slowly through the confining tube D and is there subjected, while in inflated condition, to a drying operation. Any suitable drying apparatus may be employed. It is preferred to employ a confining tube which has a smooth inner wall and which is foraminous, it being noted that the sausage casing must slip while in inflated condition through the tube. In practice, the tube may be of sufficient length to complete the drying action during the passage of the casing through the tube, assuming the casing to be moving at a practicable rate of speed.

Sausage casings produced in accordance with the improved method may, without injury, be compactly shirred upon a supporting tube adapted to be applied to a stuffer horn. The casing possesses such qualities that it will slip readily from the stuffer horn, whereas a very moist, or wet, cellulose film will not do this, but will cling quite firmly to the supporting surface. The greater strength of a dry casing makes it possible to stuff the casing tightly and full without causing the casing to bulge, or burst. The dry casing does not stretch, as does a wet one. This insures perfectly uniform filling, with no bulging whatsoever. The possibility of insuring stuffed casings of uniform diameter is an important result of the invention. The improved casings are very light in weight and are practically inert under ordinary atmospheric conditions, and will not deteriorate. Distinct advantages are gained, therefore, in connection with storing and shipping. When the casing is taken from storage, for use in the packing house, it is ready to be filled in the condition in which the packer receives it. Wet, or very moist, casings must be soaked up. Such an operation is unnecessary where the improved casings are used. Where animal casings are used, the hanks must be untied and the salt soaked out of the strands, and water must be run through the casings before using. Such operations are unnecessary where the improved cellulose casings are employed. As has been indicated, the improved casings lend themselves to the practice of mounting the casings on short dummy tubes which can readily be applied to stuffer horns. This saves a great deal of time in the packing room. For example, where an animal intestine is used more time is consumed in drawing the casing onto the horn than is used in stuffing the casing.

The above-described process may be used, if desired, in treating animal intestine sausage casings, but, of course, such casings are not available in great lengths, as is the cellulose casing. If desired, a sheep casing may be treated with a dilute solution of glycerin and may then be inflated and dried. The improved apparatus may be used for accomplishing this result and for shirring the intestinal casing upon a supporting tube adapted to be applied to a stuffing-machine horn. The glycerin acts as a softening agent for the intestinal casing as it does with cellulose casings. By treating intestinal casings in this manner, soaking of the casings and passing water therethrough, preparatorily to stuffing, may be avoided, and the labor in the packing house may be otherwise reduced.

In the modification shown in Fig. 6, D' represents a foraminous confining tube having a reduced inlet portion 16 which is fitted with a gland 17 provided with packing 18 which fits closely enough about the sausage casing A to properly confine the air which is used for inflation purposes. The gland and packing take the place of the rolls F shown in Fig. 1.

It may be added that in treating animal intestine sausage casings, while it is desirable to confine the casing during the period of inflation in order to produce a casing of substantially uniform diameter, the feature of the confining tube may be dispensed with. It will be noted that the shirring of the casing on the mandrel commences at the rear end of the mandrel and progresses toward the opposite end; also, that the inflation of the casing occurs in advance of the mandrel, successive portions of the casing being inflated as they approach the mandrel and are fed thereon; also, that the air current is introduced through the mandrel from the rear end thereof, and the air thus introduced may thus serve as a drying current, also.

The foregoing detailed description has been given for clearness of understanding only, and no unnecessary limitations should be understood therefrom, but the appended claims should be construed as broadly as permissible, in view of the prior art.

What we regard as new, and desire to secure by Letters Patent, is:

1. The method of treating casings for sausages, etc., which comprises: passing the casing through a confining tube, inflating the casing during its passage through said tube, and subjecting the casing to a drying operation during its passage through said tube.

2. The method of treating casings for sausages, etc., which comprises: passing the casing through a confining tube, inflating the casing during its passage through said tube, drying the casing while in inflated condition, and loading the casing in shirred condition upon a supporting tube as it passes from the confining tube, said supporting tube being adapted to be applied to a stuffer horn.

3. The method of treating sausage casings, which comprises: passing the casing through a dilute glycerin solution and thence into a confining tube, and thence onto a hollow mandrel; inflating the portion of the casing within the confining tube and subjecting it to a drying action during its passage through said tube; and loading the casing in shirred condition upon a supporting tube which serves as a portion of the mandrel, said supporting tube being adapted to be applied to a stuffer horn.

4. In a process of preparing a sausage casing, the steps which comprise: drying the casing and passing it over a mandrel equipped with a loading tube, and shirring the casing upon said loading tube while forwarding the casing upon said mandrel.

5. In the treatment of a sausage casing, the steps which comprise: drying the casing in inflated condition during feeding of the casing; and forwarding the casing over a mandrel and shirring the casing upon the mandrel by means of feed-rolls which aid in advancing the casing over the mandrel and serve to effect shirring of the casing upon the mandrel.

6. Apparatus for the purpose set forth, comprising a confining tube, means for feeding a casing through said confining tube, and means for inflating the casing during its passage through said confining tube.

7. Apparatus for the purpose set forth, comprising a foraminous confining tube, means for feeding a casing through said confining tube, means for inflating the casing within said confining tube during passage of the casing through said tube, and means for passing a drying current about said confining tube.

8. Apparatus for the purpose set forth, comprising a confining tube, a tubular mandrel in axial alignment therewith, means for advancing a casing through said confining tube and along said mandrel, and means for introducing air through said mandrel into the portion of the casing within said confining tube.

9. Apparatus for the purpose set forth, comprising a confining tube, a mandrel of smaller diameter in axial alignment with said confining tube, means for advancing a casing through said confining tube and along said mandrel, means for introducing air through said mandrel into the portion of the casing within said confining tube, and means for permitting escape of air through said mandrel.

10. Apparatus for the purpose set forth, comprising a foraminous confining tube, a tubular mandrel with an annular space between the advance end of said confinig tube and the rear end of said mandrel, means for introducing air through said mandrel into the portion of the casing within said confining tube, and casing-feeding means co-acting with said mandrel.

11. Apparatus for the purpose set forth, comprising a foraminous confining tube, a tubular mandrel with an annular space between the advance end of said confining tube and the rear end of said mandrel, means for introducing air through said mandrel into the portion of the casing within said confining tube, and casing-advancing and shirring means associated with said mandrel.

12. Apparatus for the purpose set forth, comprising a foraminous confining tube, a mandrel for receiving the casing as it issues from said confining tube, said mandrel being provided with a section adapted to serve as a supporting tube which can be applied to a stuffer horn, and means co-acting with said mandrel for advancing the casing on the mandrel and shirring it upon said supporting tube.

13. In apparatus for the purpose set forth, the combination of means for supporting and continuously feeding a sausage-casing, means for inflating a portion of the casing while the feeding of the casing continues, and means for drying the inflated portion of the casing.

14. In apparatus for the purpose set forth, the combination with a tubular mandrel and associated means for feeding a sausage casing, of means for inflating successive portions of the sausage casing in the passage thereof to the mandrel.

15. In apparatus for the purpose set forth, the combination of a foraminous confining tube, a tubular mandrel for receiving a sausage casing as it emerges from said confining tube, a drying chamber associated with said confining tube, and casing-feeding means associated with said mandrel.

16. In apparatus for the purpose set forth, the combination of a casing-confining tube, drying means associated therewith, a tubular mandrel adapted to receive thereon the casing as it issues from said confining tube, means for introducing air pressure through said mandrel into the portion of the casing within said confining tube, and casing-feeding means associated with said mandrel, said feeding means including means for shirring the casing upon the advance end of the mandrel.

17. In apparatus for the purpose set forth, the combination of a casing-confining tube, drying means associated therewith, a tubular mandrel adapted to receive thereon the casing as it issues from said confining tube, means for introducing air pressure through said mandrel into the portion of the casing within said confining tube, and casing-feeding means associated with said mandrel, said feeding means including means for shirring the casing upon the advance end of the mandrel and the advance end-portion of the mandrel comprising a removable loading tube adapted to be applied to a stuffer horn.

18. In apparatus for the purpose set forth, the combination of a foraminous confining tube, means for passing a sausage casing through said confining tube, drying means associated with said confining tube, a tubular mandrel adapted to receive the sausage casing as it issues from said confining tube, said mandrel being provided with a removable advance end-portion, and casing-shirring means associated with the removable advance end-portion of said mandrel.

19. In apparatus for the purpose set forth, the combination of a foraminous confining tube through which a sausage casing may be passed, a mandrel of smaller diameter adapted to receive the casing as it issues from said confining tube, and means associated with said mandrel for confining the casing closely about the mandrel at the point where the casing issues from said confining tube.

20. The method of treating casings for sausages, etc., which comprise: passing the casing through a confining tube, inflating the casing during its passage through said tube, drying the casing while in inflated condition, and loading the casing in shirred condition upon a supporting tube as it passes from the confining tube.

21. The method of treating sausage casings, which comprises: passing the casing through a dilute glycerine solution and thence into a confining tube, and thence onto a hollow mandrel; inflating the portion of the casing within the confining tube and subjecting it to a drying action during its passage through said tube; and loading the casing in shirred condition upon a supporting tube which serves as a portion of the mandrel.

22. In apparatus for the purpose set forth, the combination with a tubular mandrel and associated casing-shirring means adapted to accumulate the casing in shirred condition on the rear end-portion of the mandrel, of means for introducing an air current into the mandrel through the rear end thereof.

23. In apparatus for the purpose set forth, the combination with a tubular mandrel and associated casing-shirring means adapted to accumulate the casing in shirred condition on the rear portion of the mandrel, of a casing-feeding means disposed a short distance in front of the advance end of the mandrel, and means for introducing a casing-inflating current through the mandrel at the rear end thereof into the portion of the casing interposed between the advance end of the mandrel and said casing-feeding means.

WILLIAM F. HENDERSON.
HAROLD E. DIETRICH.